(12) United States Patent
Battistini (10) Patent No.: US 12,478,211 B2
(45) Date of Patent: Nov. 25, 2025

(54) HEAT DIFFUSER AND DISTRIBUTION PLATE ASSEMBLY FOR OUTDOOR COOKING SYSTEM

(71) Applicant: Magma Products, Lakewood, CA (US)

(72) Inventor: Rikki Martin Battistini, Orange, CA (US)

(73) Assignee: Magma Products, Lakewood, CA (US)

( * ) Notice: Subject to any disclaimer, the term of this patent is extended or adjusted under 35 U.S.C. 154(b) by 883 days.

(21) Appl. No.: 17/731,105

(22) Filed: Apr. 27, 2022

(65) Prior Publication Data

US 2023/0346162 A1     Nov. 2, 2023

(51) Int. Cl.
    *A47J 37/07*        (2006.01)
    *F24C 15/14*       (2006.01)

(52) U.S. Cl.
    CPC ........... *A47J 37/0713* (2013.01); *F24C 15/14* (2013.01)

(58) Field of Classification Search
    CPC ................ A47J 37/0635; A47J 37/0652; A47J 37/0704; A47J 37/0713; A47J 37/0786; F24C 15/14
See application file for complete search history.

(56) References Cited

FOREIGN PATENT DOCUMENTS

| | | | | |
|---|---|---|---|---|
| CN | 217510327 U | * | 9/2022 | |
| KR | 20200025008 A | * | 3/2020 | .............. A47J 37/04 |
| KR | 20200121647 A | * | 10/2020 | .......... A47J 37/0745 |
| KR | 102416459 B1 | * | 7/2022 | .......... A47J 37/0786 |

\* cited by examiner

*Primary Examiner* — Hung D Nguyen
(74) *Attorney, Agent, or Firm* — Raymond Sun (57) ABSTRACT

A grill box for an outdoor cooking system provides a heat distribution system and a grease extraction system. The grill box has a lower section, and an inner liner seated inside the lower section. The inner liner has an inner floor that defines a domed structure with a highest vertical point, with at least one heat-directing louver provided in the domed structure. An under plate is positioned in the lower section below the inner liner. In addition, the inner floor of the inner liner defines a grease flow channel that is inclined so that a portion of the grease flow channel adjacent the front is at the highest vertical level, and another portion of the grease flow channel adjacent the rear is at the lowest vertical level, so that the grease flows from the front to the rear, and is disposed of through a grease drainage hole adjacent the rear.

15 Claims, 7 Drawing Sheets

HEAT DIFFUSER AND DISTRIBUTION PLATE ASSEMBLY FOR OUTDOOR COOKING SYSTEM

BACKGROUND OF THE INVENTION

1. Field of the Invention

The present invention relates to an outdoor cooking system, and in particular, to an outdoor cooking system that provides a distribution plate assembly that facilitates better heat distribution to the cooking surface, and which provides a grease flow path for the disposal of grease.

2. Description of the Prior Art

Outdoor cooking systems are becoming more sophisticated to provide grillers with improved grilling and cooking experiences. Given the nature of a cooking system in terms of where it is used (usually outdoors), and how it is used, the surrounding environment significantly impacts the performance of the cooking system.

All outdoor cooking systems have a grill box disposed over a firebox. The grill box is where the cooking occurs, and usually includes a flat plate that acts as a heat diffuser. Unfortunately, the conventional flat plates create uneven heat distribution. In addition, the heat from the burner (in the firebox) that is directed on the flat plate diffuser will cause it to wear out in a short period and replacement would be difficult because the flat plate is normally integrated into the base of the grill box.

Another drawback associated with conventional grill boxes is that there is no grease extraction and the flat plate diffuser experiences flare-ups when grease falls on to it.

Thus, there remains a need for a grill box that can be used for a cooking system that addresses these two important factors to provide a better and improved cooking experience.

SUMMARY OF THE DISCLOSURE

It is an object of the present invention to provide a grill box for a cooking system that provides improved heat distribution for cooking.

It is another object of the present invention to provide a grill box for a cooking system that provides for effective grease extraction.

In order to accomplish the objects of the present invention, there is provided a grill box for an outdoor cooking system that provides a heat distribution system and a grease extraction system.

The grill box has a lower section, and an inner liner seated inside the lower section. The inner liner has an inner floor that defines a domed structure with a highest vertical point, with at least one heat-directing louver provided in the domed structure. An under plate is positioned in the lower section below the inner liner.

In addition, the inner floor of the inner liner defines a grease flow channel that is inclined so that a portion of the grease flow channel adjacent the front is at the highest vertical level, and another portion of the grease flow channel adjacent the rear is at the lowest vertical level, so that the grease flows from the front to the rear, and is disposed of through a grease drainage hole adjacent the rear.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
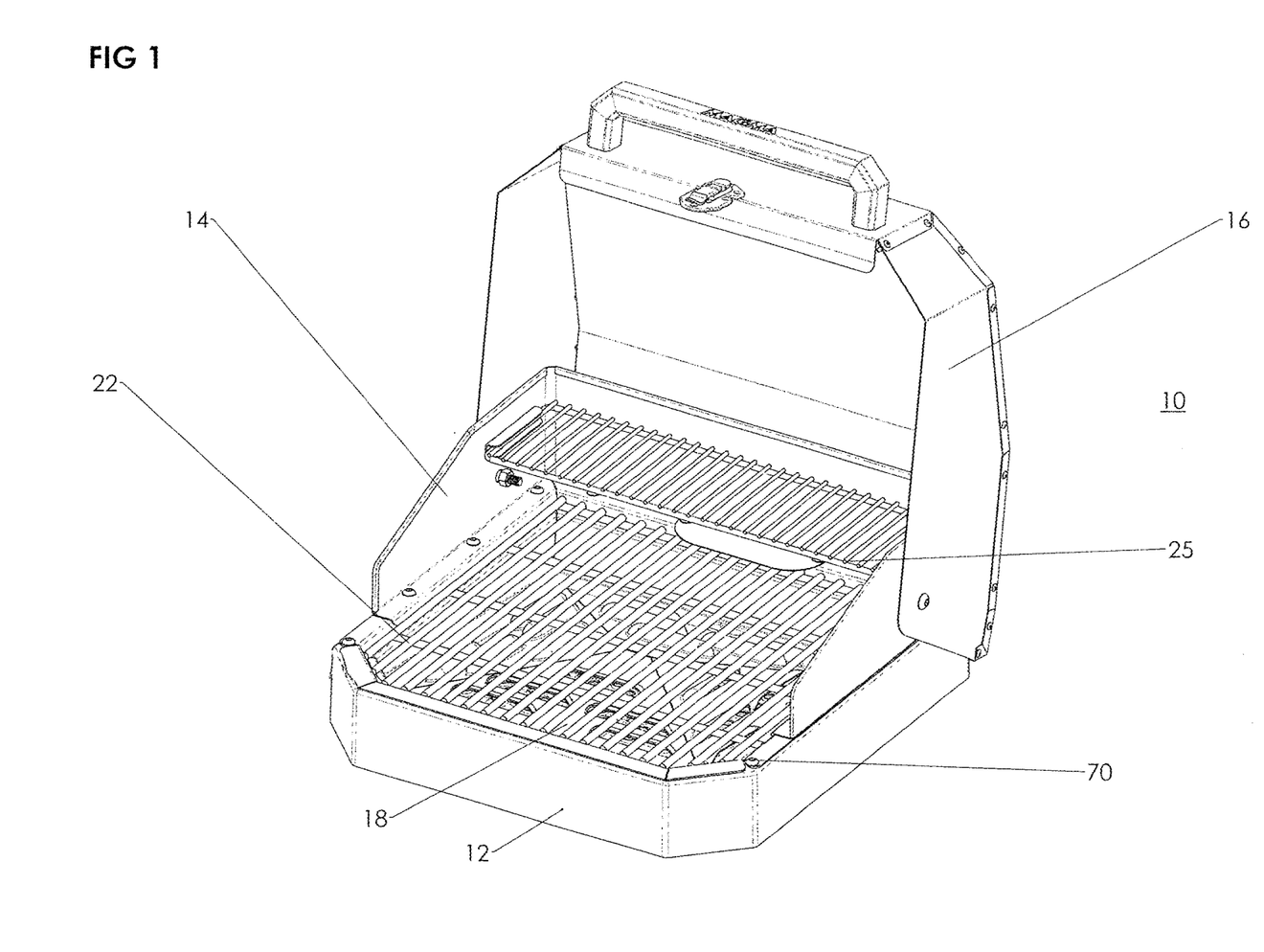
FIG. 1 is a perspective view of the grill box according to one embodiment of the present invention.

FIG. 1 illustrates a grill box 10 that is adapted for use with a cooking system that includes a firebox (not shown) positioned below the grill box 10. The cooking system is similar to any conventional cooking system and has the grill box 10 disposed over a firebox. The firebox can be any conventional firebox, and can be secured over any moveable or fixed support. The present disclosure will focus only on the grill box 10 as the firebox can be the same as any conventional firebox.

Figure 2:
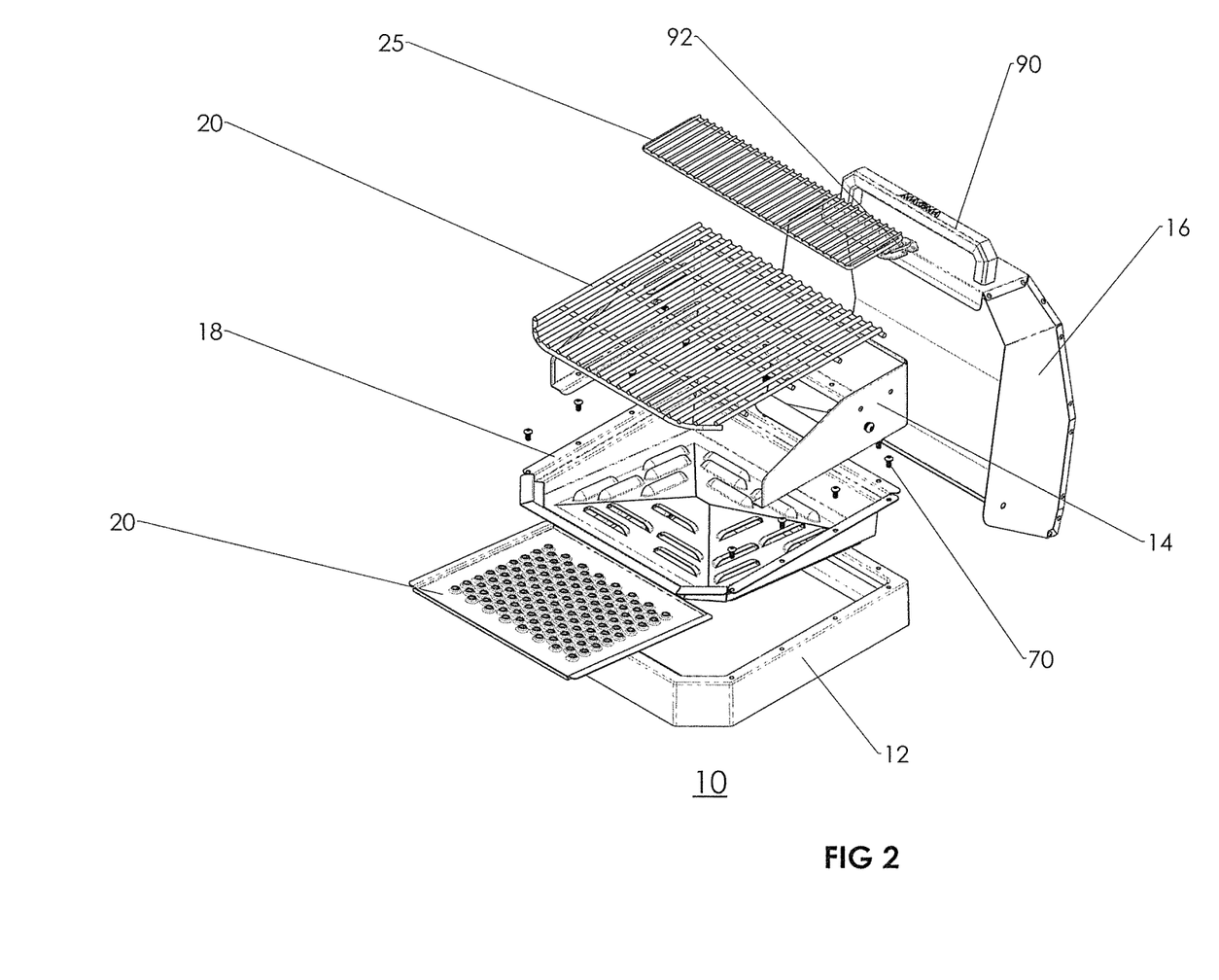
FIG. 2 is an exploded perspective view of the grill box of FIG. 1.
Figure 3:
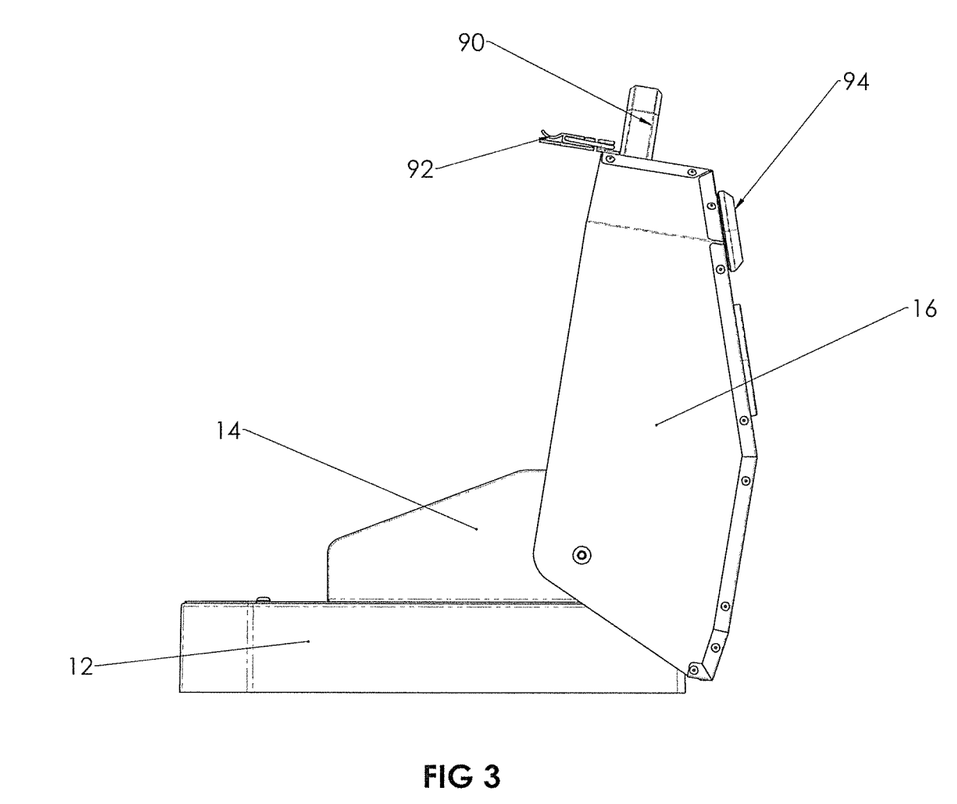
FIG. 3 is a side plan view of the grill box of FIG. 1.

Referring now to FIGS. 1-3, the grill box 10 has a lower cast section 12 ("lower section") that functions as a base. A grill box upper section 14 is seated on top of the lower section 12 and a grill box lid 16 is pivotably secured to the upper section 14 and adapted to cover the lower section 12 and the interior of the grill box 10. A grill box inner liner 18 is seated inside the lower section 12, and a sacrificial under plate is positioned below the inner liner 18. A grill grate 22 is positioned above and over the inner liner 18. Food to be cooked is placed on the grate 22 for cooking. A warming rack 25 is positioned above grill grate 22 and inside the upper section 14.

The grill box lid 16 has a handle 90, a securing latch 92 for locking the lid 16 to lower section 12, and a temperature gauge 94. These are conventional items provided with any conventional grill box and will not be described in greater detail herein.

The sacrificial under plate 20 can be a flat plate made of metal, with a pattern of 128 raised directional through holes 50 provided on the surface thereof. These through holes 50 direct the air flow and heat generated from burner upwards to the grill box inner liner 18.

Figure 4:
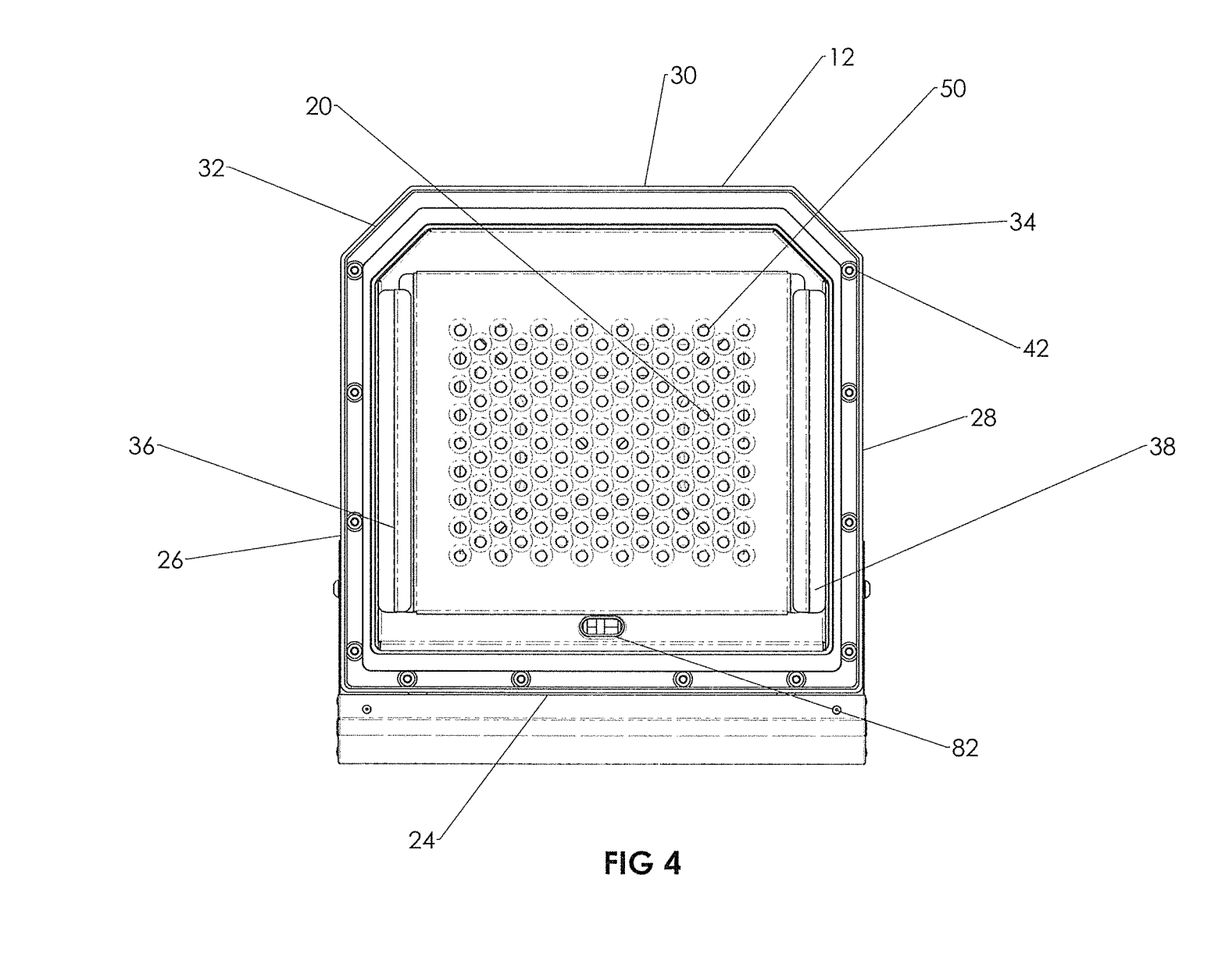
FIG. 4 is a bottom plan view showing the bottom of the under plate positioned inside the lower section.
Figure 5:
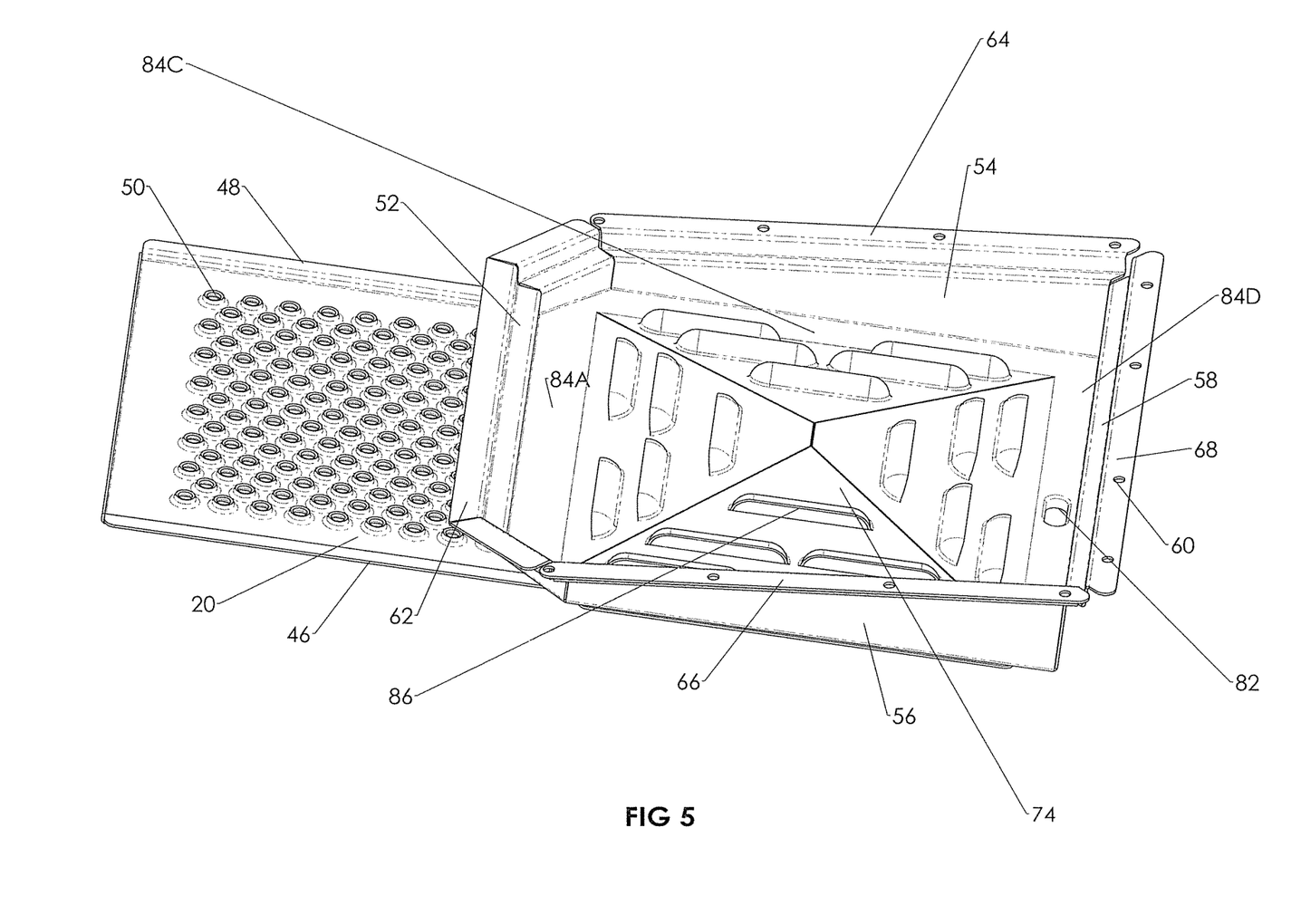
FIG. 5 is a top perspective view showing the inner liner and the under plate.

Referring also to FIGS. 4 and 5, the lower section 12 is essentially a plurality of side walls that define an interior space. Specifically, the lower section 12 has a rear wall 24, two side walls 26 and 28, and a front wall 30 that is connected to the side walls 26, 28 by two angled walls 32 and 34. Two slide rails 36 and 38 are provided along the underside of the grill box inner liner 18, and are adapted to receive the under plate 20, whose side edges 46 and 48 can be slid into the slide rails 36 and 38, respectively. The horizontal back surface of the grill box inner liner 18 has a grease drainage hole 82. A plurality of screw-holes 42 are spaced apart along the top of the rear wall 24 and the side walls 26 and 28.

Figure 6:
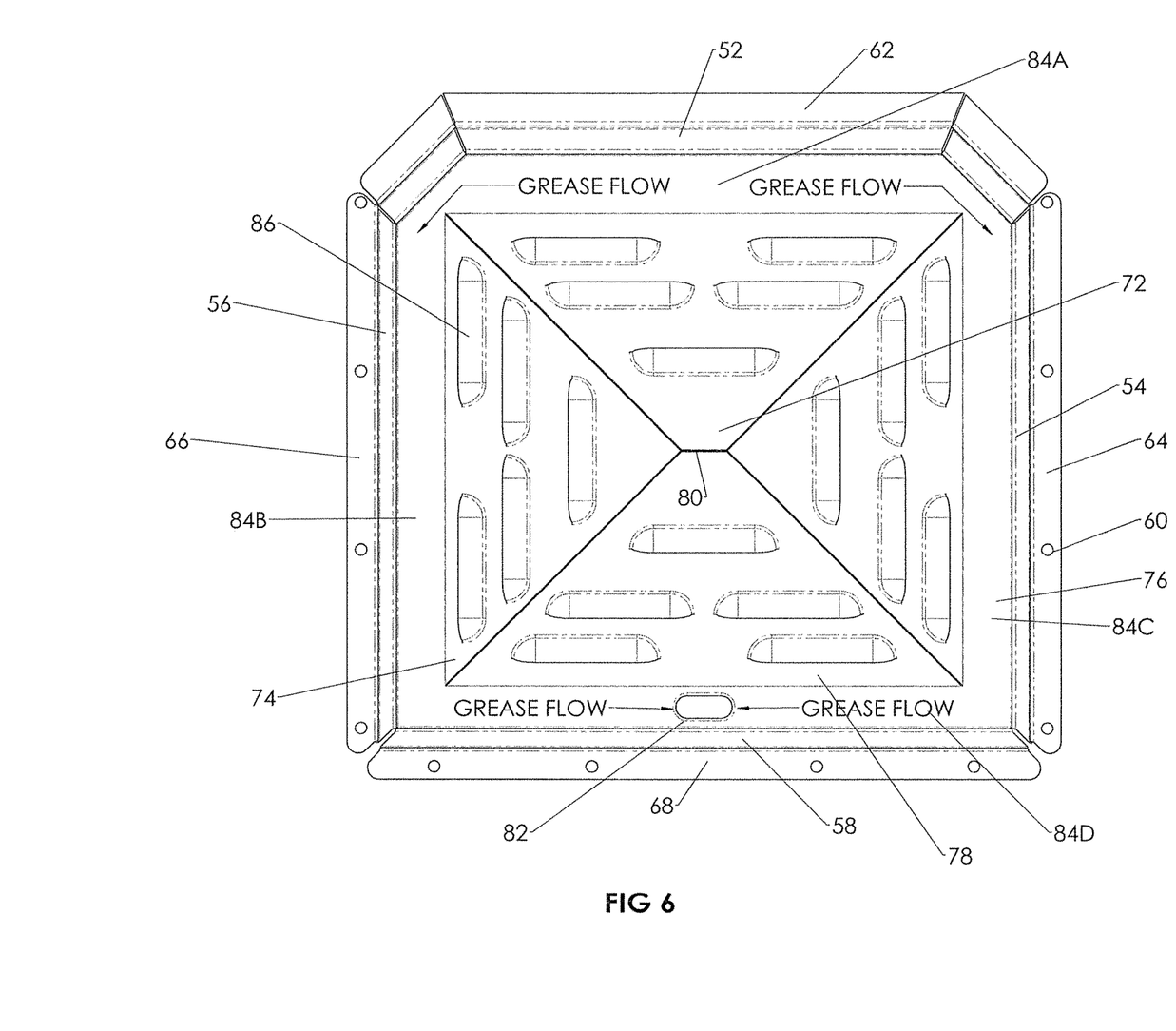
FIG. 6 is a top plan view of the inner liner.

Referring also to FIGS. 5 and 6, the inner liner 18 has a tapered inner floor that is fully surrounded by an enclosing wall. The enclosing wall includes a front wall 52, two side walls 54 and 56, and a rear wall 58. The front wall 52 has the smallest vertical height among the walls 52, 54, 56 and 58, and the rear wall 58 has the greatest vertical height among the walls 52, 54, 56 and 58. The front wall 52 and the rear wall 58 each has a uniform height throughout, but each of the side walls 54 and 56 has a tapering height that gradually increases from the front wall 52 to the rear wall 58, as best shown in FIG. 5. Flanges or lips 62, 64, 66 and 68 extend from the top edges of the walls 52, 54, 56 and 58, respectively, and are adapted to be seated on top of the walls 24, 26, 28 and 30, respectively, of the lower section 12. A plurality of screw-holes 60 are spaced apart along the top of the flanges 64, 66 and 68, and aligned with corresponding screw-holes 42 on the top of the rear wall 24 and the side walls 26 and 28, so that screws or bolts 70 can be inserted through corresponding aligned screw-holes 42 and 60 to secure the grill box upper section 14 and the inner liner 18 to the top of the lower section 12.

The tapered inner floor of the inner liner includes four angled sections 72, 74, 76 and 78 that define a pyramidal dome. Specifically, each angled section 72, 74, 76 and 78 is inclined at an angle towards a center line 80 so that the four angled sections 72, 74, 76 and 78 have a highest vertical point that meet at the center line 80. This allows grease that falls on to any of these four angled sections 72, 74, 76 and 78 to be able to flow down each angled section to a grease flow channel along the floor of the inner liner that has four sections 84A, 84B, 84C and 84D which surround the outer edges of the four angled sections 72, 74, 76 and 78 at the base of each of the walls 52, 54, 56 and 58, respectively. The overall grease flow channel is also inclined or angled so that the section 84A (adjacent the front wall 52) is at the highest vertical level, and the section 84D (adjacent the rear wall 58) is at the lowest vertical level, so that the two side sections 84B and 84C are inclined or angled to allow the grease to flow from the front (section 84A) to the rear (section 84D). A grease drainage hole 82 is provided on the section 84D. As a result, grease from the grate 22 is directed by the four angled sections 72, 74, 76 and 78 and the sections 84A, 84B, 84C and 84D, and directed along the sections 84B and 84C so that all the grease is collected at the section 84D and directed towards the grease drainage hole 82.

Even though the present invention shows four angled sections 72, 74, 76 and 78 that have a highest vertical point that meet at the center line 80, it is possible to provide the domed structure with any number of angled sections (e.g., three, five or more), or in a curved conical type of configuration where there are no separate defined sections. The center line 80 can be a center point in the case of a conical type configuration. The same principle still applies in that one or more inclined surfaces are provided to provide a domed structure for heat distribution and grease flow in the manner discussed below.

Figure 7:
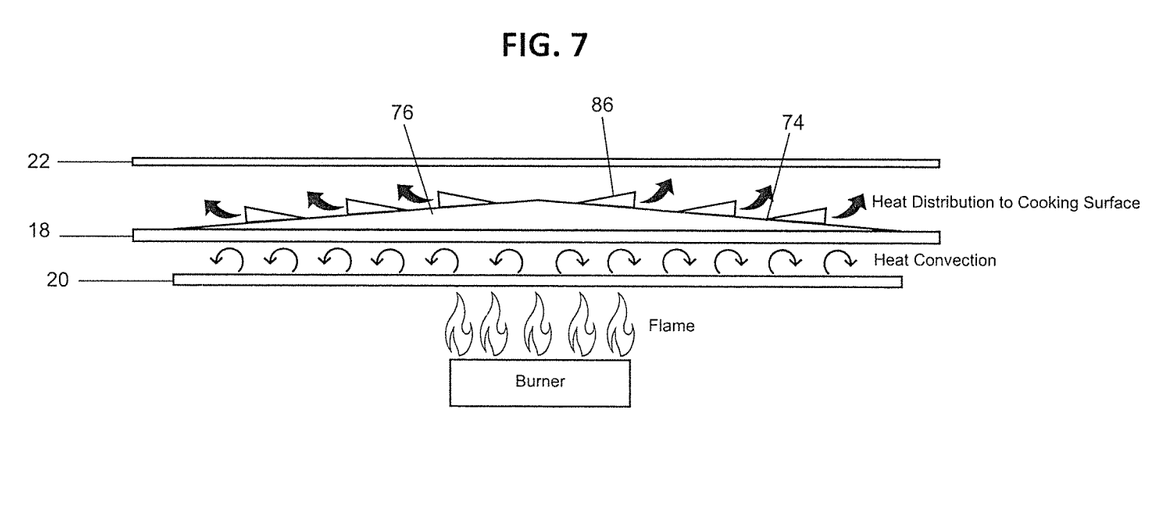
FIG. 7 illustrates how the under plate and inner liner function to distribute heat from a burner.

Finally, heat directing louvers 86 are provided on the surfaces of the four angled sections 72, 74, 76 and 78. These heat directing louvers 86 are on the four opposing surfaces of the pyramid shaped angled sections 72, 74, 76, and 78 that direct the heat from the sacrificial under plate 20 in each of these four directions to evenly spread the heat to the grill grate 22. As best shown in FIGS. 5 and 7, each louver 86 is hood-shaped with an angled directional wall that extends from the respective angled section 72, 74, 76 or 78, with an opening defined between the louver 86 and the respective angled section 72, 74, 76 or 78.

FIG. 7 illustrates how the inner liner 18 and the under plate 20 function to distribute/diffuse heat. Heat generated from the burner is transferred to the under plate 20 that creates heat convection between the under plate 20 and inner liner 18. This convection heat rises up into the inner liner's angled sections 72, 74, 76, and 78 and is disbursed through general heat transfer of the inner liner 18, as well as forced heat expulsion through the openings defined by the heat directing louvers 86 that evenly heat the cooking grate 22. Note that FIG. 7 is a one-dimensional drawing that only illustrates the transfer of heat and heat convection from the burner, lower sacrificial under plate 20, and the inner liner 18 to the cooking surface.

Thus, the present invention provides a uniquely designed built-in two-piece liner/plate assembly that aids in diffusing the flame/heat output from the burner in the firebox below. The upper portion of the diffuser plate assembly has four opposing angles defined by the pyramid shaped angled sections 72, 74, 76, and 78, with a total of twenty profiled heat directing louvers 86, for distributing uniformed heat to the entire grilling surface of the grill box 10.

The lower portion of the assembly is a removeable sacrificial heat distribution plate 20 that distributes the heat to the upper plate defined by the pyramid shaped angled sections 72, 74, 76, and 78. This heat distribution lower plate was designed to take the majority of the heat output from the burner's flame, which in turn prevents the upper plate from overheating, and aids in reducing flare-ups at the upper most surface.

By design, the horizontal surfaces of the inner liner 18 have all been angled towards the rear of the grill box 10 to aid in directing cooking grease drippings/flow away from the heat source and to a centrally located drainage hole 82, going to the grease containment compartment (not shown), located in the center of the back horizontal surface 84D. Incorporated vertical walls 54, 56 and 58 with a full upper securing lip 62, 64, 66, and 68 on the lower section 12 additionally aid in containing the cooking grease within the grill box 10, and ultimately directing the grease towards the drainage hole 82.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A grill box for an outdoor cooking system, comprising:
   a lower section;
   an inner liner seated inside the lower section, the inner liner having an inner floor that includes four angled sections that define a pyramidal dome, wherein each angled section is inclined at an angle towards a center line so that the four angled sections have a highest vertical point that meet at the center line, and wherein each angled section has at least one heat-directing louver; and
   an under plate is positioned in the lower section below the inner liner.

2. The grill box of claim 1, further including:
   an upper section that is seated on top of the lower section; and
   a grill box lid pivotably secured to the upper section.

3. The grill box of claim 1, wherein the inner floor is surrounded by an enclosing wall that is defined by four walls that includes a front wall, two side walls, and a rear wall, wherein the front wall has the smallest vertical height among the four walls, the rear wall has the greatest vertical height among the four walls, and each of the side walls having a tapering height that gradually increases from the front wall to the rear wall.

4. The grill box of claim 3, wherein the inner floor of the inner liner defines a grease flow channel that has four grease sections, each grease section adjacent an outer edge of one of the four angled sections, wherein the grease flow channel is inclined so that the grease section adjacent the front wall is at the highest vertical level, and the grease section adjacent the rear wall is at the lowest vertical level, so that the two grease sections adjacent the two side walls are inclined to allow the grease to flow from the front wall to the rear wall, and wherein the grease section adjacent the rear wall has a grease drainage hole.

5. The grill box of claim 1, wherein the under plate is a flat plate, with a pattern of raised directional through holes provided thereon.

6. The grill box of claim 1, wherein each louver is hood-shaped with an angled directional wall that extends from the respective angled section, with an opening defined between the louver and the respective angled section.

7. The grill box of claim 1, wherein the inner liner has a front and a rear, and wherein the inner floor of the inner liner defines a grease flow channel that has four grease sections, each grease section adjacent an outer edge of one of the four angled sections, wherein the grease flow channel is inclined so that the grease section adjacent the front is at the highest vertical level, and the grease section adjacent the rear is at the lowest vertical level, so that the grease flows from the front to the rear, and wherein the grease section adjacent the rear has a grease drainage hole.

8. A cooking system, comprising:
a firebox having a burner;
the grill box of claim 1 disposed above the burner; and
wherein a heat path is defined by heat being directed towards the under plate, and then from the under plate through the inner floor and the heat-directing louvers of the inner liner.

9. A grill box for an outdoor cooking system, comprising:
a lower section;
an inner liner seated inside the lower section and having a front and a rear, the inner liner having an inner floor that defines a domed structure with a highest vertical point; and
wherein the inner floor of the inner liner defines a grease flow channel, wherein the grease flow channel is inclined so that a portion of the grease flow channel adjacent the front is at the highest vertical level, and another portion of the grease flow channel adjacent the rear is at the lowest vertical level, so that the grease flows from the front to the rear, and wherein the another portion of the grease flow channel adjacent the rear has a grease drainage hole.

10. The grill box of claim 9, wherein a plurality of heat-directing louvers is provided on the domed structure.

11. The grill box of claim 9, wherein the inner floor includes four angled sections that define a pyramidal dome, wherein each angled section is inclined at an angle towards a center line so that the four angled sections have a highest vertical point that meet at the center line, and wherein each angled section has at least one heat-directing louver.

12. The grill box of claim 11, wherein the grease flow channel has four grease sections, each grease section adjacent an outer edge of one of the four angled sections, wherein the grease flow channel is inclined so that the grease section adjacent the front is at the highest vertical level, and the grease section adjacent the rear is at the lowest vertical level, so that the grease flows from the front to the rear.

13. The grill box of claim 12, wherein a grease flow path is defined by the angled sections to the grease flow channel to the grease drainage hole.

14. The grill box of claim 9, further including an under plate positioned in the lower section below the inner liner.

15. The grill box of claim 9, wherein a grease flow path is defined by the domed structure to the grease flow channel to the grease drainage hole.

* * * * *